A. R. LONG.
FUEL FEEDING AND IGNITION MEANS.
APPLICATION FILED JAN. 8, 1920.
1,384,473. Patented July 12, 1921.
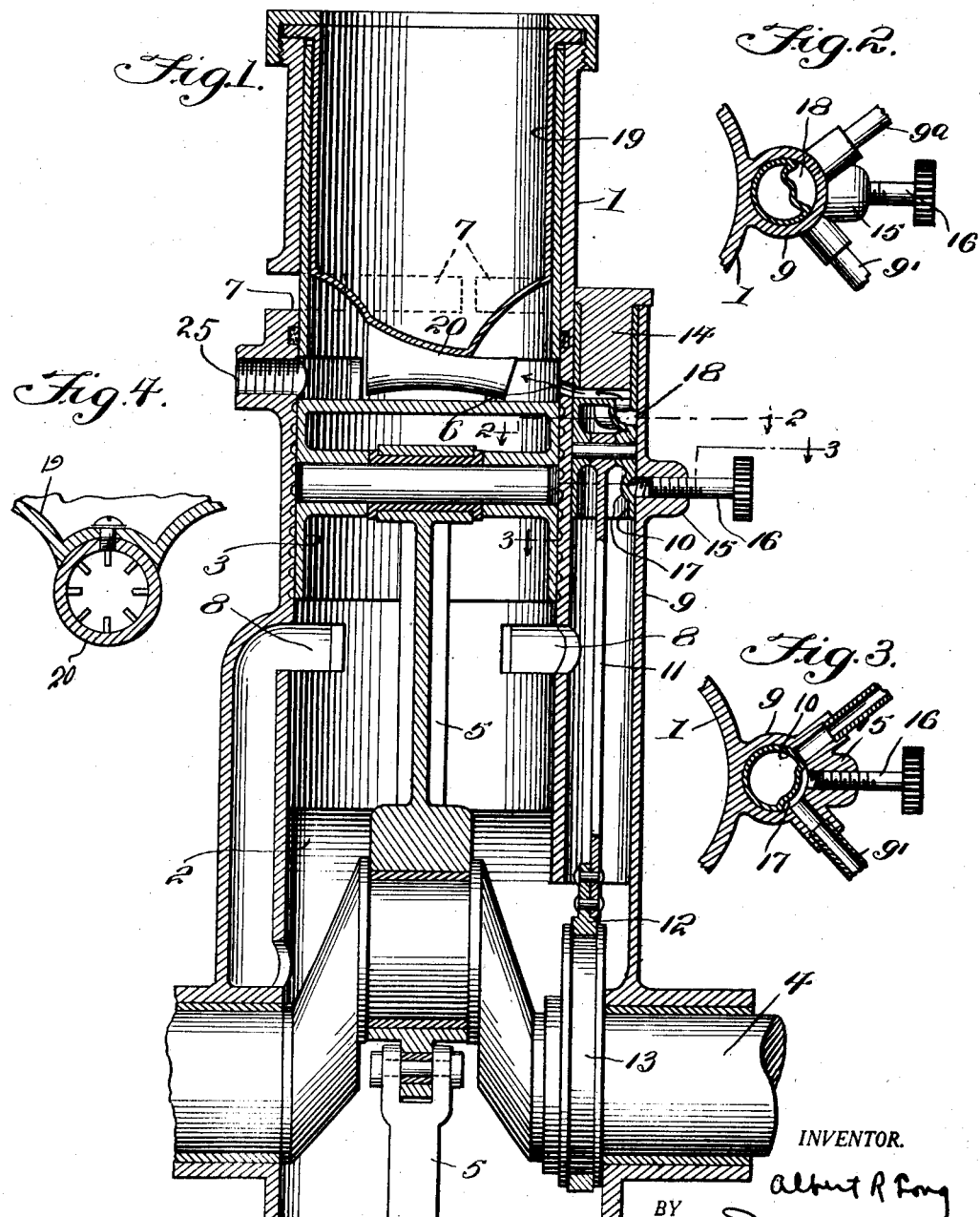

UNITED STATES PATENT OFFICE.

ALBERT R. LONG, OF BALLSTON, VIRGINIA.

FUEL FEEDING AND IGNITION MEANS.

1,384,473.          Specification of Letters Patent.    Patented July 12, 1921.

Application filed January 8, 1920. Serial No. 350,097.

*To all whom it may concern:*

Be it known that I, ALBERT R. LONG, citizen of the United States of America, residing at Ballston, in the county of Alexandria and State of Virginia, have invented certain new and useful Improvements in Fuel Feeding and Ignition Means, of which the following is a specification.

This invention relates to improvements in fuel feeding and ignition means therefor; the salient objects being to provide a novel form of valve for measuring and discharging at predetermined and recurring intervals a measured charge of combustible fuel into the firing chamber of the cylinder or cylinders of an engine, particularly low compression engines; to provide a means for supplying fuel to the firing chamber of an engine cylinder in a manner which will eliminate uneven burning of the same therein, and in consequence avoid considerable "engine trouble" such as "preignition" or "knocking" caused by improper burning of fuel and the resultant undesirable accumulation of fuel and "flame spreads" therefrom; and to provide a novel ignition means which will dispense with spark plug difficulties some of which are caused by "porous" porcelain insulators thereon allowing leakage of current therethrough with the result that the current instead of jumping the gap between the usual terminals of the plug will take the course offering least resistance, namely to the "ground" thereby causing a "miss" of the engine cylinder.

Other objects will be in part obvious and in part pointed out hereinafter.

The invention will be clearly understood from the following detailed description when considered in connection with the accompanying drawings forming a part thereof and illustrating one embodiment of the invention.

In the drawings:

Figure 1 is a vertical section through an engine employing my improved fuel feeding and igniting means;

Fig. 2 is a horizontal section taken on the line 2—2 of Fig. 1;

Fig. 3 is a similar section taken on the line 3—3 of Fig. 1, and

Fig. 4 is a detail in elevation of the form of incandescent igniting device.

Having more particular reference to the drawings in connection with which like reference characters will designate corresponding parts throughout the several views thereof, 1 indicates the cylinder of a two cycle engine, 2 the crank case thereof, and 3 the piston working in said cylinder having connection with the ordinary crank shaft through a pitman 5. A small upwardly disposed diagonal fuel intake port 6 is formed in one wall of the cylinder 1 while circumferentially arranged exhaust ports 7 are formed therein above the fuel intake port, said exhaust ports, by their circumferential disposition permitting of rapid exhaustion of burnt gases from the engine cylinder. Air ports 8 are also formed in the lower portion of the cylinder and have communication with an air supply in the crank case 2. Since, however, the above description is merely for the purpose of facilitating a general understanding of the type of engine employing the present invention, it is not my intention to burden this specification with further or specific description of said engine the construction of which is fully described and claimed in a copending U. S. application for Letters Patent filed by me January 8th, 1920, Serial No. 350,098. Also it may be stated that the invention may be used upon engines of the four cycle type.

Positioned on one side of the cylinder 1 is a secondary cylinder or housing 9 provided with a fuel feed 9′ and an air feed 9ᵃ arranged in the same plane and slidably receiving a valve 10 of the piston type, the rod 11 of which extends downwardly and has connection with a yoke 12 engaging an eccentric 13 mounted on the crank shaft 4. The upper end of this housing is normally closed by a plug 14 which, of course, may be removed when necessary. As means for measuring the fuel charge to be delivered to the cylinder 1, a screw threaded opening 15 is formed in the housing 9 and has an adjusting screw 16 turned thereinto provided with a suitable head or handle. Formed in the lower portion of the valve 10 is a way 17 which is adapted to communicate at times with the fuel feed 9′ and the screw 16, namely upon upward movement of the valve thus permitting a quantity of fuel to be delivered from the fuel feed to the pocket for ultimate passage to the cylinder 1, such passage being effected through the forming of a second way 18 in the center portion of the valve 10 and which is adapted to establish communication between the engine cylinder through intake 6 and the measuring pocket upon downward movement of said valve to cause alinement of said way with the air feed 9ᵃ at properly timed periods, the air feed 9ᵃ serving to furnish a blast whereby to clear the gas entirely from the measuring pocket when the valve is in lower position and also to mix sufficient air therewith to promote combustion.

Secured to a downwardly extending lug carried on the head 19 of the cylinder 1 is the improved igniting device 20, comprising a tapered flaring tube having a plurality of pins 21 arranged on its inner face; the plate and pins, obviously, being arranged in the path of travel of the gaseous charge introduced by way of the intake port 6. Subsequently to the start of the engine the plate with its pins 21 will be heated to an incandescence by the continued explosions or flame spreads in the cylinder 1 and therefore, the measured charges of fuel discharged into said cylinder will be properly superheated and then ignited. In this way, difficulty with carbureters now experienced will be eliminated since the fuel will not be in form of a heavy mist as is the case with carbureters and further, will be measured only in such quantities as are required to properly operate the engine. It may be here noted, that because of the heavy mist like form into which fuel is transformed by a carbureter, an uneven burning of the same results, allowing small particles of fuel to accumulate and be held suspended in the air inside the hot cylinder walls, thus producing a charge which will expand into a gas thereby forming a second flame spread and the "knocking" of the engine.

If desired a boss 25 may be formed on the cylinder 1 to accommodate a suitable type of spark plug for use in starting the engine and igniting the charges until the igniting device 20 is heated to the desired temperature.

The operation of the invention may be reviewed as follows:

Valve 10 is moved upwardly in its housing by connection with the eccentric 13 thus allowing a charge of fuel to be passed into the fuel pocket upon alinement of the way 17 with the fuel feed 9′ and the measuring pocket 15. Downward movement of the valve then occurs effecting disalinement of the way 17 and alinement of the way 18 with the fuel measuring pocket, and the air feed 9ᵃ whereupon the fuel in said pocket will be swept therefrom into the valve by the inrushing air from the feed 9ᵃ. As the crank shaft starts its second cycle the valve 10 with its way 18 now containing the measured charge of fuel is moved upward compressing the combustible charge in the valve so that when the way 18 alines with the fuel intake port 6 said fuel will be projected through the port into the cylinder 1 under pressure whereat it contacts with the igniting device 20 and is exploded.

The gaseous charge may, of course, be readily varied in quantity by adjusting the screw 16 to increase or decrease the fuel measuring pocket, such as conditions or preference may dictate.

While I have illustrated and described with a considerable degree of particularity, constructional details of my invention, it is to be understood that said invention is not limited thereto, but may be modified within a wide range without departing from the essence of the invention, the construction shown and the description based thereon being intended to be taken in an illustrative rather than a limiting sense.

What I claim is:

1. In combination with an engine cylinder, a housing adjacent to and communicating therewith, air and fuel supply means for the housing, said housing having a pocket in one side wall thereof and a valve operable in the housing for conveying fuel to said pocket whereat it is measured and then conveyed by continued operation of said valve for discharge into the cylinder.

2. In combination with an engine cylinder, a housing adjacent to and communicating therewith, air and fuel supply means for the housing, said housing having a pocket variable in size in the side thereof and means operable in the housing for controlling the passage of fuel to said pocket and from the pocket to the cylinder.

3. In combination with an engine cylinder, a housing adjacent to and communicating therewith, having a fuel measuring pocket variable in size in the wall thereof, fuel supply means for the housing, and a valve reciprocably arranged in the housing and operable by the engine having a pair of ways therein, one of which permits passage of fuel from said supply means to said pocket when the valve is in one position and the other of which permits the passage of the measured fuel to the engine cylinder when said valve is in a second position.

In testimony whereof I affix my signature in presence of two witnesses.

ALBERT R. LONG.

Witnesses:
EDNA J. SHEEHY,
K. L. MILLS.